United States Patent [19]

Engle

[11] Patent Number: 5,462,394
[45] Date of Patent: Oct. 31, 1995

[54] LATCHMASTER SLIDING PULL UP HITCH

[75] Inventor: Thomas H. Engle, Cape Vincent, N.Y.

[73] Assignee: Knorr Brake Holding Corp., Westminster, Md.

[21] Appl. No.: 984,566

[22] PCT Filed: Sep. 12, 1991

[86] PCT No.: PCT/US91/06576

§ 371 Date: Oct. 4, 1993

§ 102(e) Date: Oct. 4, 1993

Related U.S. Application Data

[63] Continuation-in-part of Ser. No. 581,384, Sep. 12, 1990, Pat. No. 5,112,172.

[51] Int. Cl.[6] .................................................. B60P 7/13
[52] U.S. Cl. ........................... 410/59; 410/64; 414/333
[58] Field of Search ............................ 410/58–64, 56; 414/333, 340

[56] References Cited

U.S. PATENT DOCUMENTS

| | | |
|---|---|---|
| 2,846,172 | 8/1958 | Gutridge et al. . |
| 2,903,977 | 9/1959 | Ulinski . |
| 2,916,238 | 12/1959 | Fahland . |
| 3,236,194 | 2/1966 | Vivian . |
| 3,358,954 | 12/1967 | Smith et al. . |
| 3,424,107 | 1/1969 | Rollins . |
| 4,718,800 | 1/1988 | Engle ............................... 410/61 |
| 5,017,065 | 5/1991 | Krug et al. ........................ 410/58 |
| 5,139,374 | 8/1992 | Holt et al. ......................... 410/64 |

FOREIGN PATENT DOCUMENTS

| | | |
|---|---|---|
| 0241899 | 10/1987 | European Pat. Off. . |
| 1290945 | 3/1969 | Germany . |

*Primary Examiner*—Michael S. Huppert
*Assistant Examiner*—James Keenan
*Attorney, Agent, or Firm*—Barnes & Thornburg

[57] ABSTRACT

A stanchion is provided with a latch system which is operable from the tractor which positions the trailers such that a gate on the tractor locks and unlocks the latch to appropriately reposition the stanchion during the positioning of the trailer. The tractor also includes a hook which engages the stand to raise the stand during loading of the trailer from its lowered to its raised position to engage and secure the tractor and also to reposition the unlocked stand during unloading of the trailer.

4 Claims, 11 Drawing Sheets

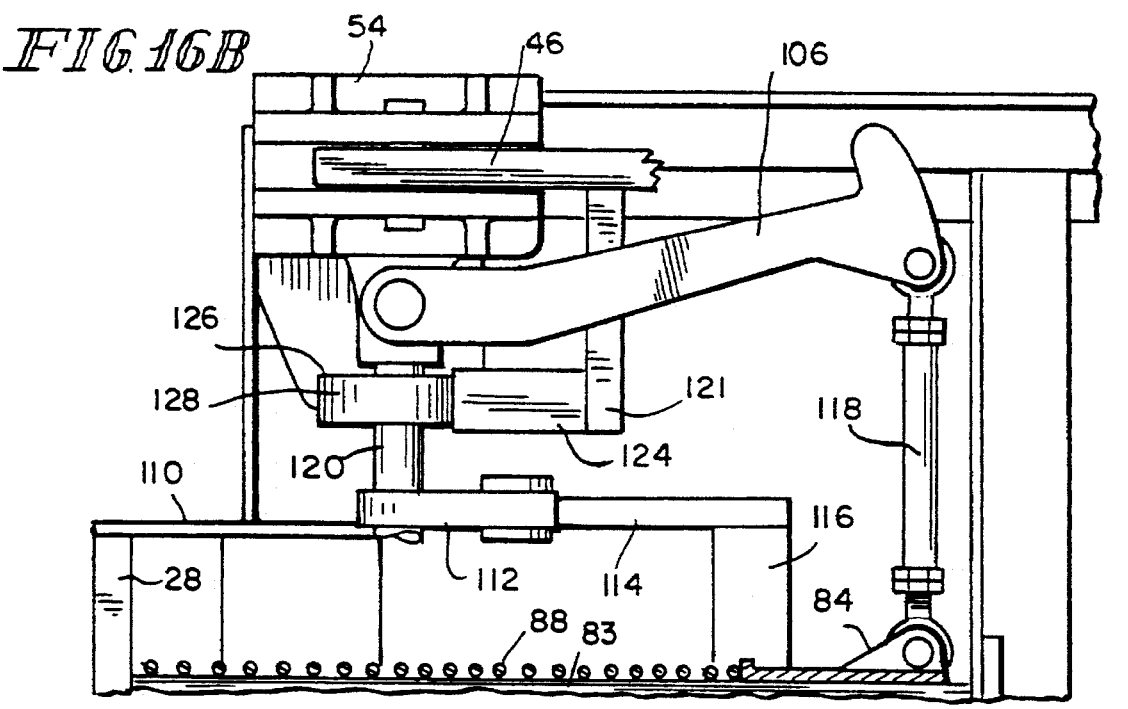
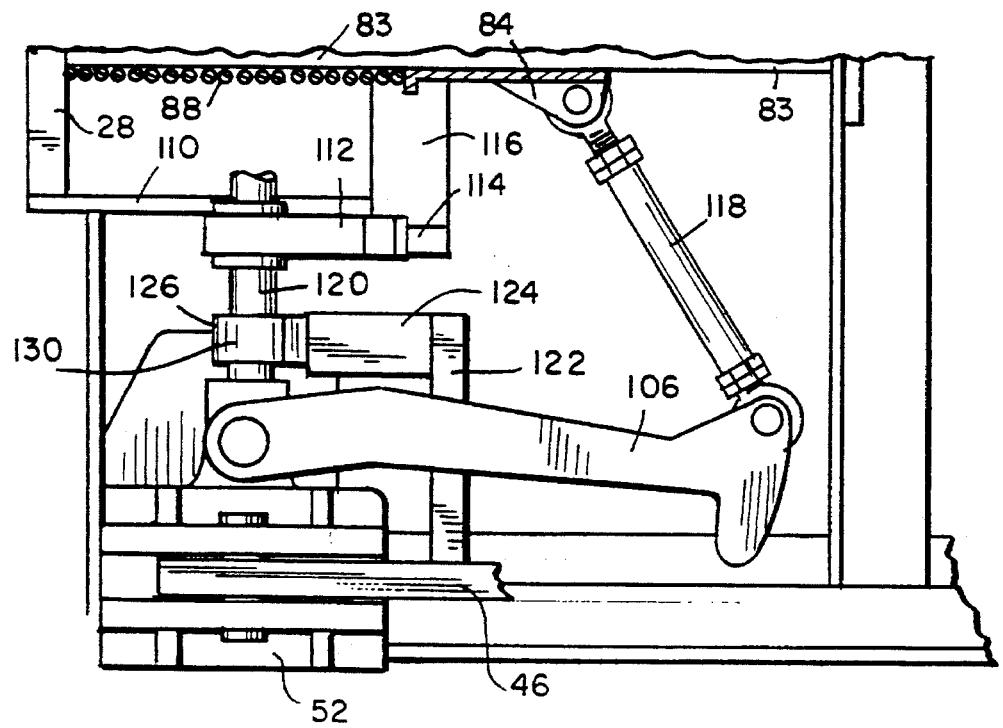

LATCHMASTER SLIDING PULL UP HITCH

This is a continuation-in-part of U.S. Ser. No. 07/581,384 filed Sep. 12, 1990, now U.S. Pat. No. 5,112,172.

TECHNICAL FIELD

The present invention relates generally to supports for trailers on railroad cars and more specifically to an improved stanchion to support trailers on railroad cars.

BACKGROUND ART

It is well known to transport trailers of trucks on railroad cars, namely, flat bed railroad cars. Some designs have used specialized structure railroad cars and adapters for the landing gear of semi-trailer trucks as illustrated in U.S. Pat. No. 2,864,321. Others have provided stands for the king pin of the trailer which ride along a pair of slots in the surface of the railroad car, and generally include a manually actuated mechanism to hold the stand in place on the car after adjustment. Examples of these structures are shown in U.S. Pat. Nos. 2,845,878; 2,846,172 and 2,903,977.

Collapsible fifth wheel stands have also been installed at one end of a flat bed and arranged to be raised by a chain pulled by a truck tractor beneath a parked trailer to secure it to the railroad car. This is shown in U.S. Pat. No. 3,202,390. Examples of stationary, collapsible fifth wheel stands which are raised or lowered by spring, screws or hydraulic include U.S. Pat. Nos. 3,180,282; 3,189,307; 3,291,074 and 3,289,987.

A self-propelled stanchion which can be positioned along the surface of the railroad car and raised and lowered using internal or external motors is described in my U.S. Pat. No. 4,718,800. But its operation was independent of the trailer positioning.

All of the systems of the prior art have advantages and disadvantages. Those which use specialized car design are not usable to transport other types of freight. Those which have erect stand are not as storable and require the removal of unused stands at one location and a supply at the unloading location if there is further loading to be performed. Some of the collapsible stands are not adjustable along the surface of the flat bed and, thus, do not allow for optimum placement of the maximum number of trailers on a train system. The positioning and securing of the stanchions require special equipment or more than one operator or plural steps in addition to positioning connecting and disconnecting the trailer.

Thus, it is an object of the present invention to provide a stanchion which is adjustable along the surface of a railroad car.

Another object of the present invention is to provide a stanchion system which reduces the number of steps in loading, securing, unsecuring and unloading a trailer on and from a railroad car.

Still another object of the present invention is to provide a system wherein the stanchion is repositioned and operated from the tractor which positions the trailer.

These and other objects of the invention are obtained by providing a stanchion with a-latch system which is operable from the tractor which positions the trailer such that the tractor locks and unlocks the latch to appropriately reposition the stanchion during the positioning of the trailer. The stanchion includes a sled to which a stand is mounted. The latch is biased to be normally engaged to the rail car to prevent movement of the sled, and in response to an external force from the tractor disengages the rail car to prevent movement of the sled. The latch includes at least one dog and an operator or piston moving the dogs to disengage a railroad car in response to an external force. The operator and dogs are biased to the engaging position. The sled includes a channel which receives a horizontal portion of a track and the dogs engage the vertical portion of the track. The track includes a plurality of apertures in which the dogs are received.

An interlock is provided between the latch and the stand for permitting the latch to disengage from the railroad car only when the stand is in the lowered position. The interlock includes a cam connected to the latch and having a camming surface which has a first and second position corresponding to the lock and unlocked position of the latch. A cam follower is connected to the stand for at least engaging the cam surface in the second position when the stand is in the lowered position. The cam follower disengages the cam surface in the first position when the stand is not in the raised position.

The tractor includes a gate having a locking and unlocking position. In the unlocking position, the gate engages the operator of the latch when the tractor is adjacent to the sled to apply the external force to unlock the latch. In the locking position, the gate does not apply the external force to the latch when the tractor is adjacent to the sled. The tractor also includes a hook which engages the stand for two purposes. First it is used during loading of the trailer to raise the stand of a latched or locked sled from its lowered to its raised position to engage and secure the tractor. Second, when the stand is in its lowered position and the tractor's unlocking gate is in its unlock position the hook engages the stand and prevents motion of the sled away from the adjacent tractor. With the sled and stand thus captured between the hook and the gate, any movement of the tractor in either forward or reverse direction, will be transmitted to the unlocked sled, and it will thus move with the tractor and be repositioned during the loading and unloading of the trailer by the tractor.

The hook may be a single element manipulated by an operator or may be a pair of .links pivotally connected and moved between an extended and retracted position by an operator in combination with a third link. The hook is mounted on a slide block to the tractor, and a shock absorber is provided. This increases the ability to-move the hook while the stand is in the raised position. The hook includes first and second members pivotally connected together to form the hook. A lock is provided having a first position for locking the first and second members into a hook configuration and a second position to allow first and second members to rotate relative to each other. Thus, when the hook is unlocked, the forward motion of the tractor relative to the stand will cause the two members to rotate relative to each other and release the hook configuration and the hook from the stand. Biasing means such as a spring is provided for biasing the first and second members into the hook configuration.

A method of loading and securing a trailer to the railroad car using the tractor includes positioning the trailer over a lowered stanchion on the surface of the railroad car. The trailer and stanchion are then repositioned to a desired position on the surface of the railroad car using the tractor. The tractor is disconnected from the trailer and the stanchion is raised by the tractor to connect and secure the trailer to the railroad car. Apparatus on the tractor as mentioned above is used to unlock the stanchion from the railroad car before the repositioning step and lock the stanchion after the repositioning step. Apparatus on the tractor activates a hook to hook a portion of the stanchion to the tractor before the raising step and to unhook the stanchion from the tractor after the raising step.

The method of unloading a trailer secured to a railroad car by a stanchion using a tractor includes positioning the tractor adjacent to the trailer and the stanchion. Next, the tractor disconnects the trailer from the stanchion and connects the trailer to the tractor. The tractor repositions the trailer and the stanchion to a desired position in which the stanchion is to be stowed, and finally removes the trailer from the railroad car.

The tractor disconnects the trailer from the stanchion by lowering the stanchion. The tractor unlocks the stanchion from the railroad car by applying an unlocking force before the repositioning step and relocks the stanchion to the railroad car after the repositioning step. A hook on the tractor engages the stanchion after it is unlocked and pulls it to its repositioned position and then unhooks from the stanchion before removing the trailer. The stanchion is repositioned to one end of the railroad car to be ready for the next loading operation.

Thus, the unique stanchion and its manipulation by the tractor allows the stanchion to be repositioned during loading and unloading, in order to secure the most efficient use of deck space on the train, as well as being raised and lowered. Similarly, all the operations, repositioning and controlling of the stanchion are performed from the tractor, thereby reducing the amount of time, the number of steps and the number of people involved in the loading and unloading of the trailer and the positioning and repositioning of the stanchion.

Other objects, advantages and novel features of the present invention will become apparent from the following detailed description of the invention when considered in conjunction with the accompanying drawings.

BRIEF DESCRIPTION OF THE DRAWINGS

FIGS. 16A and 16B are partial plan views with partial cutaways of a stanchion according to the principles of the present invention.

DISCLOSURE OF THE INVENTION

Figure 1:
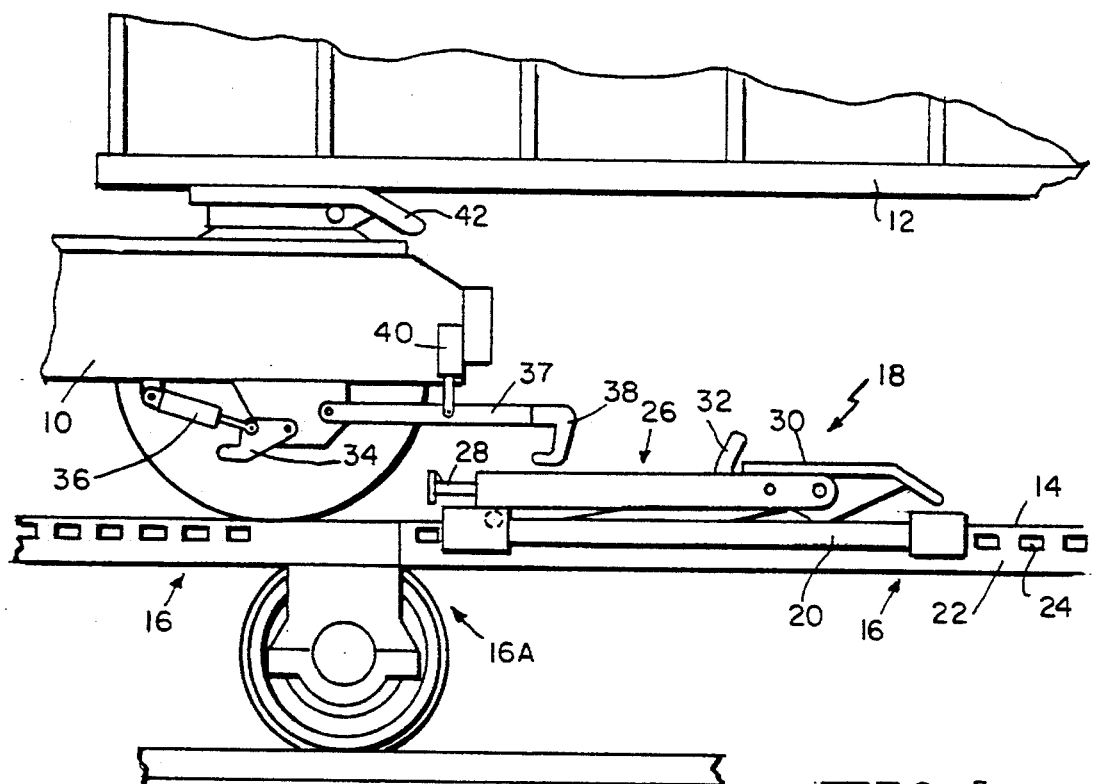
FIGS. 1–5 are schematic representations illustrating a method of loading a trailer on a railroad car according to the principles of the present invention.

The present system as illustrated in FIGS. 1–9 includes a tractor 10 connected to or to be connected to a trailer 12, which is to be positioned along a surface 14 of railroad cars 16. A stanchion 18 is mounted on the railroad car 16 to support the trailer 12 and secure it to the railroad car 16. The stanchion 18 includes a slide frame 20 which slides along a rail 22 in the individual cars 16 and a stand 26 pivotally mounted to the slide 20. The rails 22 include a plurality of apertures 24 to receive a latch mechanism which is released by external force applied to plunger 28. A fifth wheel connection 30 is on the stand 26, as is the standard release mechanism 32. A pair of cars 16 are shown with the stanchion 18 at one end of the car frame 16A of the right car. The details of the latch mechanism and the stanchion 18 will be described with respect to FIGS. 10 and 11.

The tractor 10 is shown with the closest wheel removed to expose the additional mechanism applied thereto according to the present invention. A gate 34 which applies external force to the plunger 28 of the latch mechanism of the stanchion 18 is pivotally mounted to tractor 10 and is controlled by fluid device or motor 36. In FIG. 1, the gate 34 is shown in its raised or locking position, and in FIG. 2 in its lowered unlocking or position. Also pivotally mounted to the tractor 10 is a hook 38 controlled by fluid device or motor 40 to be in its raised or unhooking position of FIG. 1, or its lower and hooking position of FIG. 2. The tractor 10 also includes a fifth wheel connection 42 to receive the king pin 44 of the trailer shown in FIG. 4.

The loading process begins, as illustrated in FIG. 1, with the stanchion 18 at one end 16A of a car 16 and the plunger 28 extended under spring biasing such that the latch mechanism is in its locked position. Trailer 12 is backed onto the car 16 by a tractor 10. The gate 34 is up in its locking position and the hook 38 is also up in its unhooking position. Trailer 12 is backed onto the decks of the cars 16 and over the dropped or lowered stanchions 18 until the platform on which the desired stanchion is located is reached.

Figure 2:
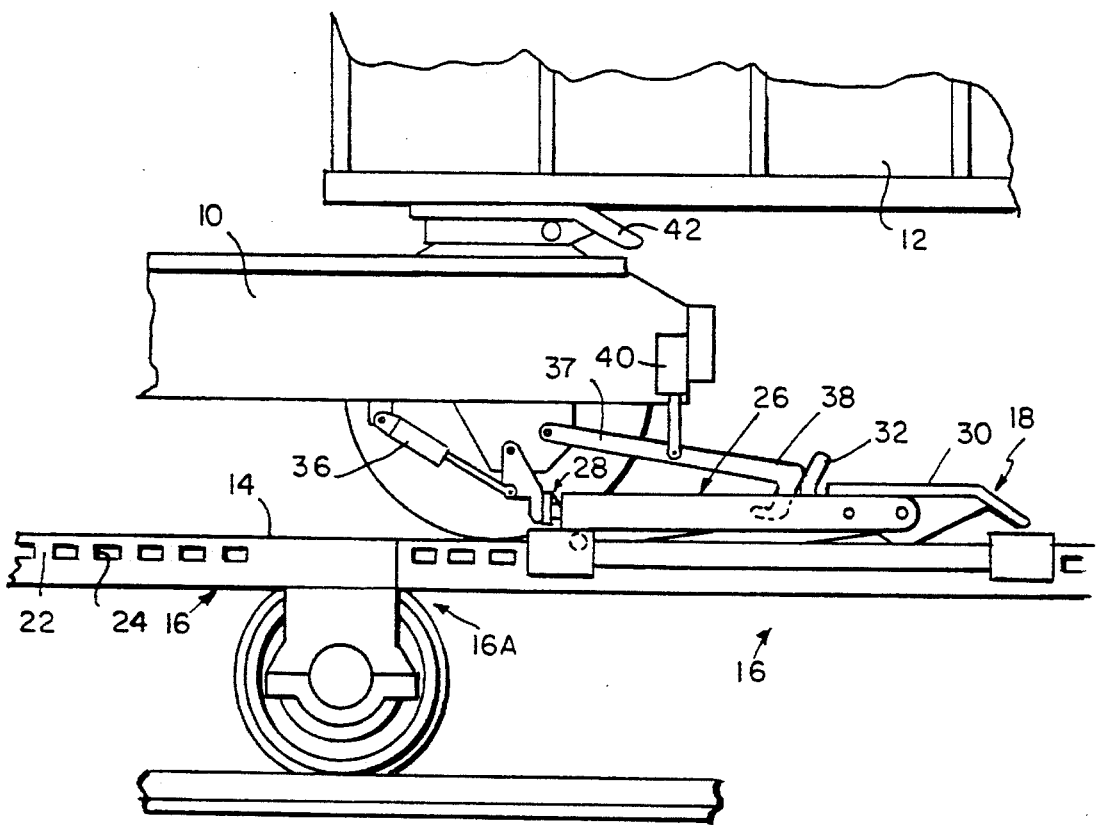

Upon approaching the desired stanchion 18, the operator lowers the gate.34 by fluid motor 36 to its down position as illustrated in FIG. 2. The tractor 10 continues to back up the trailer 12 until the gate 34 engages the plunger 28, overcoming the spring bias of the latch and unlocking the stanchion 18. The continued rearward movement of the tractor 10 moves the trailer 12 and repositions the stanchion 18 through force applied by gate 34 to the desired location along the deck 14 of the car 16. The operator also lowers the hook 38 using fluid motor 40 in preparation for later use.

Since the latching mechanism is in its lock position, the initial pressure applied by gate 34 to the plunger 28 moves the plunger relative to the sled. As the latch unlatches, the friction between the sled 20 and the surface of the car and the rails generally prevents movement of the sled relative to the railroad car and these by maintains the latch in its unlocked position. Thus the biasing of the spring is generally less than the friction force. To further assure that the latch mechanism will unlatch or unlock the stanchion 18, the lowered hook 38 is caused to lie in an opening in the frame of the stand 26 which includes a bar. Forward movement of the hook relative to the stanchion will cause the hook 38 to engage the bar. This may be by hydraulics or by forward movement of the tractor 10. Once hook 38 engages the stanchion, the gate 34 is lowered to engage the plunger 28 and drive it back against the spring bias to unlock the latch. Thus the stanchion 18 and the plunger 28 are secured between the hook 38 and the gate 34. This not only assures unlatching or unlocking of the stanchion 18, but maintains this unlatched position for either direction of travel of the tractor 10. The distance between the hook 38 and the lowered gate 34 is selected to be substantially equal to the distance between the bar on the stand 26 and the contracted plunger 28.

Figure 3:
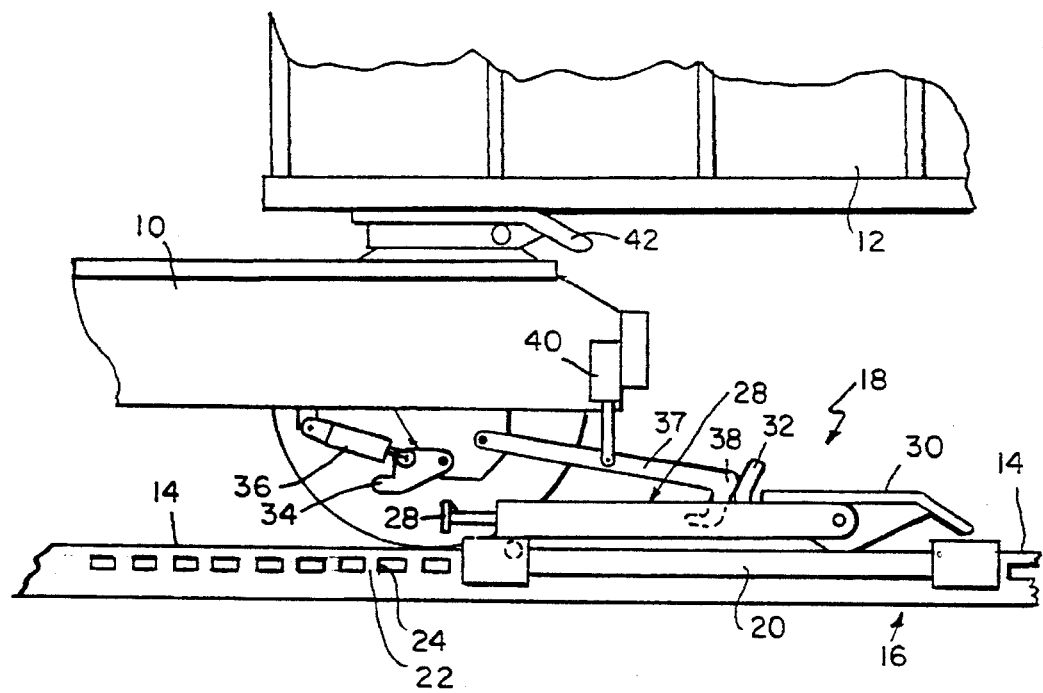

When the desired position on the surface 14 of car 16 is reached, the operator raises gate 34 from its lowered or unlocking position to its raised position or locking position. Plunger 28 is then extended and the stanchion 18 is latched or locked into place at a specific position along the surface 14 of car 16. The extended plunger 28 is illustrated in FIG. 3. The operator then sets the trailer brakes, releases the king pin from the fifth wheel connection 42, and moves the tractor forward.

Figure 4:
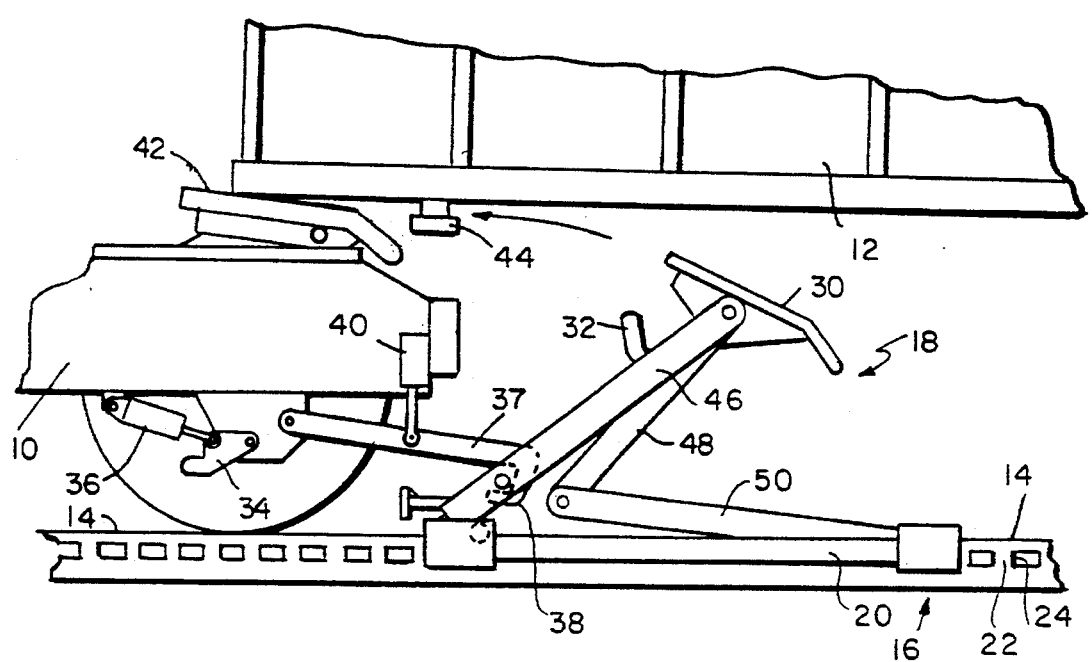

Since the hook 38 lies in an opening in the frame of the stand 26 which includes a bar, and the stanchion 18 is latched or locked to the rail 22, the forward movement of the tractor 10 causes the hook 38 to engage the bar and raises the stand 24. Simultaneously, the king pin 44 of the trailer 12 slides out of the tractor fifth wheel connection 42 as illustrated in FIG. 4. As the tractor 10 continues to move forward, the trailer 12 begins to shift from the fifth wheel connection 42 of the tractor 10 to the stanchion 18 fifth wheel connection 30. The fifth wheel connection 30 of the stanchion continues forward relative to the trailer 12 as a result of the pivoting of the stand 26. The hook adjustment is such that the release trigger 32 is not depressed at the full up position unless the tractor 10 is backed up by the operator.

Figure 5:
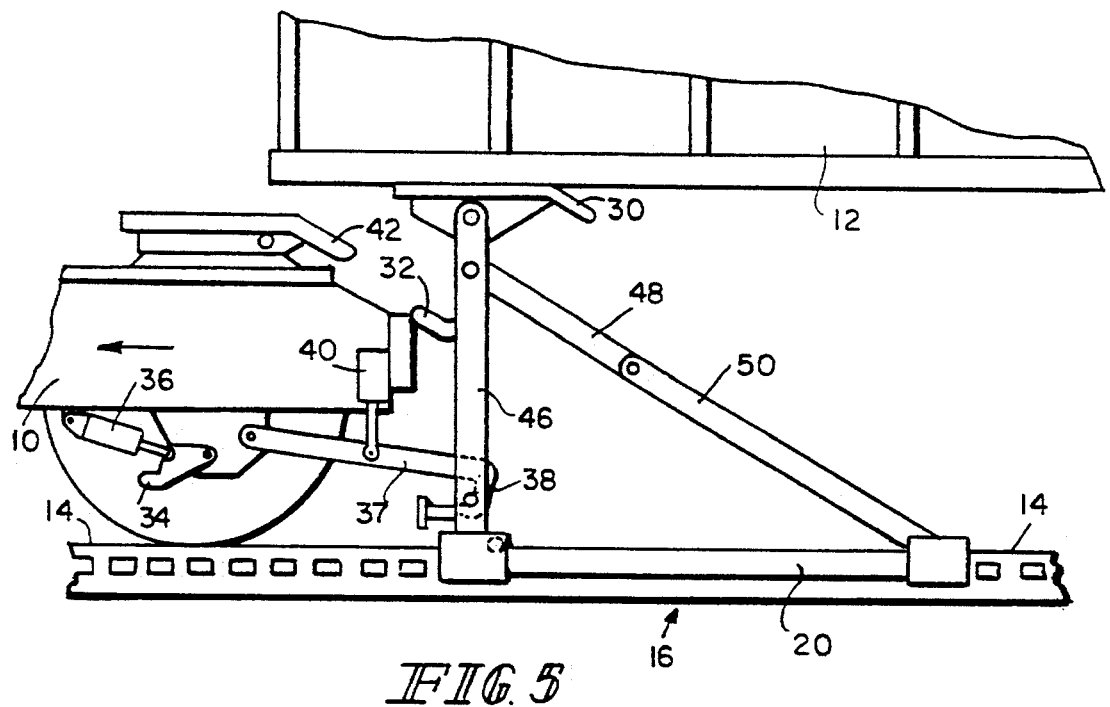

With continued forward movement of the tractor 10, as illustrated in FIG. 5, all the weight of the trailer 10 is now on the upright stanchion 26. Vertical member 46 is upright and the diagonal brace members 48 and 50 are locked to each other. The operator on the tractor 10 then raises the hook 38, disengaging it from the vertical member 46. To be certain that the king pin 42 of the trailer 12 is engaged by the fifth wheel connection 30 of the stanchion, the tractor is pulled forward and its fifth wheel connection 42 is raised. Tractor 10 is then backed against trailer 12 to push the king pin 44 home into the fifth wheel connection 30 of the stanchion 18. This completes the loading and securing of the trailer 12 to the car 16.

Figure 6:
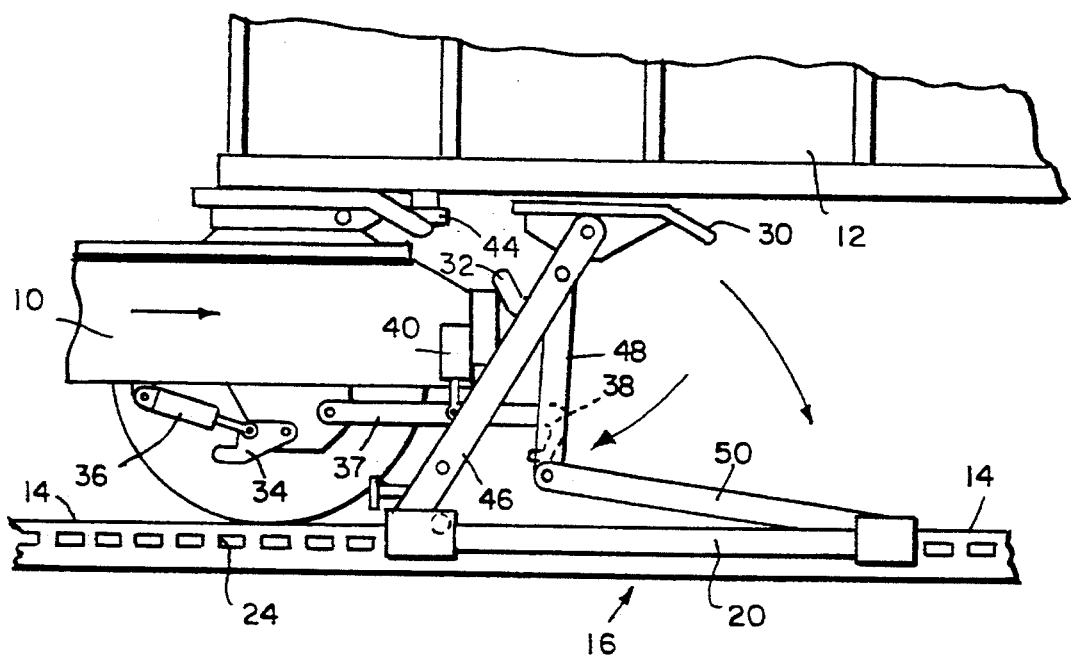
FIGS. 6–9 are schematic representations of the method of unloading a trailer from a railroad car according to the principles of the present invention.
Figure 7:
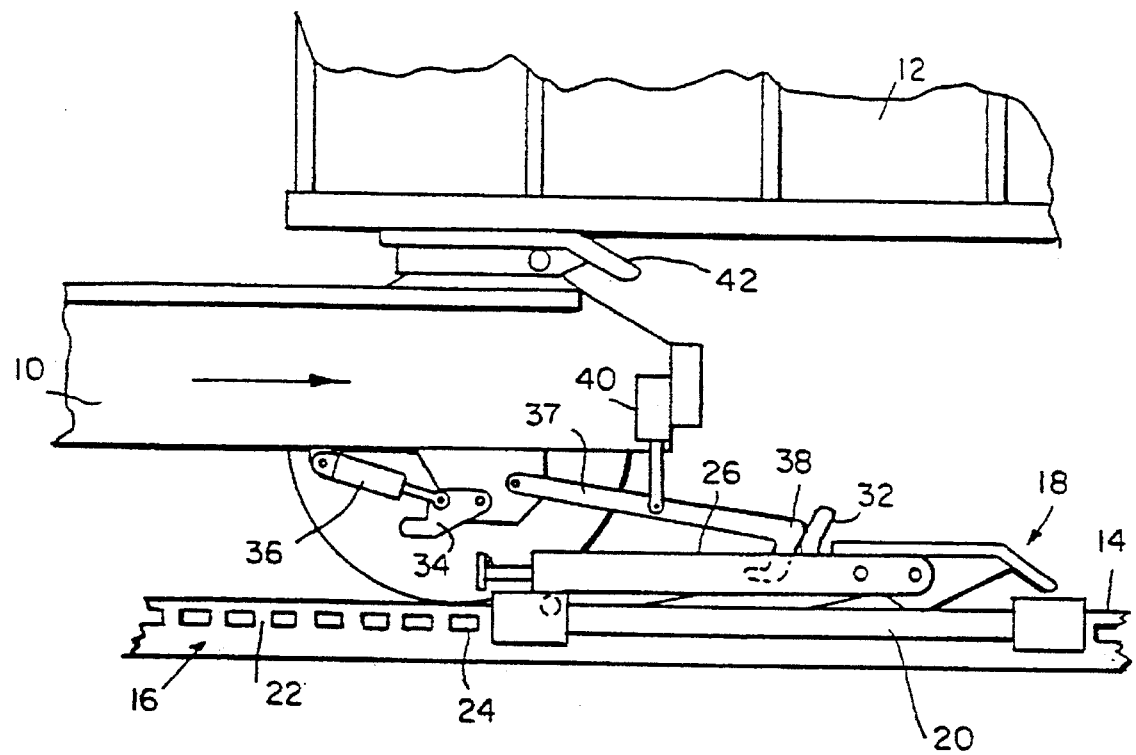

The unloading operation begins by backing up the tractor 10 until it is adjacent to the stanchion 18 and under the trailer 12. As the back of the tractor 10 engages trigger 32, it depresses it, releasing both the diagonal brace members 48 and 50 and the trailer king pin 44 and fifth wheels 30 latch. With this continued movement as illustrated in FIG. 6, the stanchion 18 collapses with the weight shifting from the fifth wheel connection 30 of the stanchion 18 to the fifth wheel connection 42 of the tractor 10. The latch mechanism of the stanchion 18 is in its locked position, allowing this to occur. Similarly, the gate 34 and the hook 38 on the tractor 10 are in their raised positions. Tractor 10 continues backwards, and the trailer king pin 44 couples to the tractor fifth wheel connection 42 of the tractor 10. The driver then connects the brake hoses of the tractor 10 to the trailer 12 and releases the trailer brakes. Stanchion 18 is in its completely collapsed position as illustrated in FIG. 7.

Figure 8:
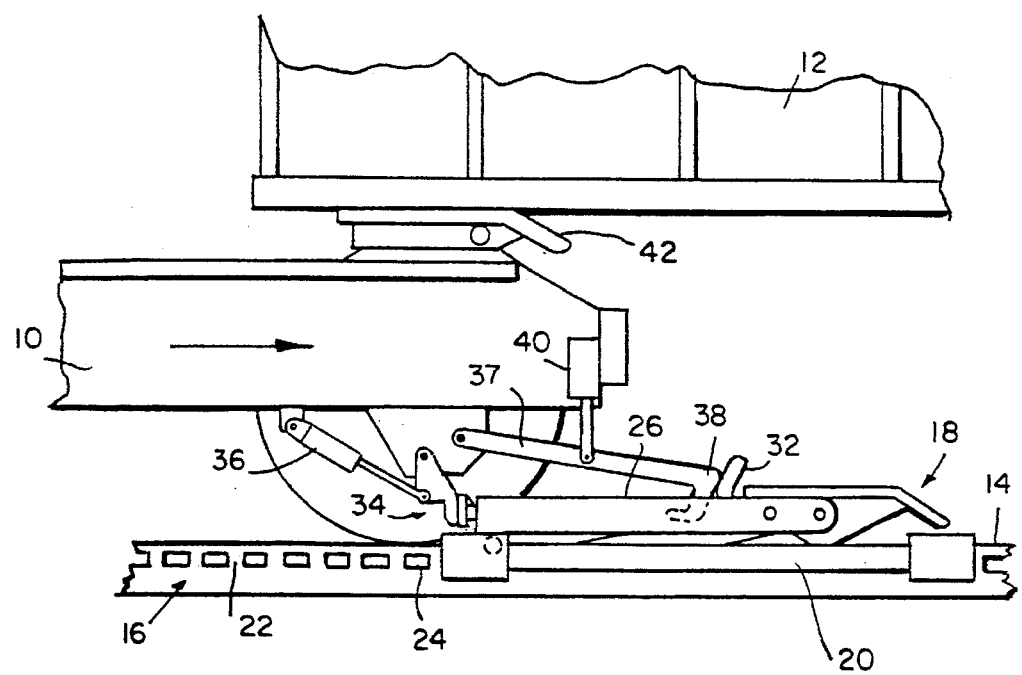
Figure 9:
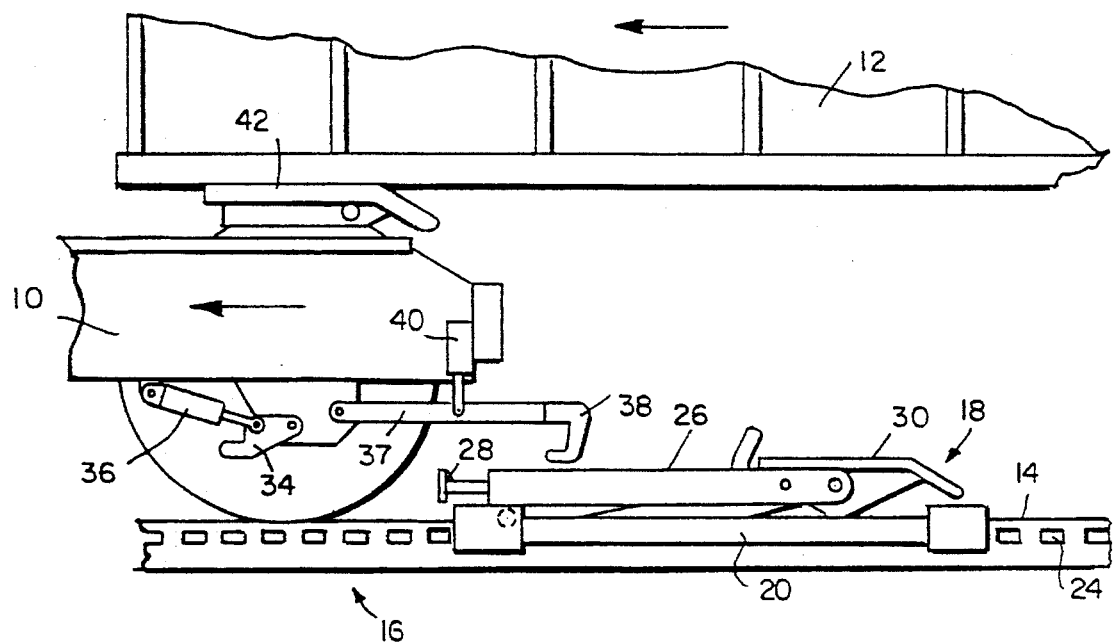

To reposition the stanchion 18 at the front end 16A of car 16, the operator activates fluid motor 40 to drop the hook 38 to its lowered position to hook the stanchion 18. This is illustrated in FIG. 7. Next, the operator activates the fluid motor 36 to lower the gate 34 to depress the plunger 28 to unlock the latch mechanism of the stanchion 18. With the plunger 8 and stanchion 18 secure between hook 38 and gate 34 the stanchion 18 moves forward or backward with the trailer 12 and the tractor 10 when it moves forward along the deck as illustrated in FIG. 8. At the end of the deck 16A, the operator raises the hook 38 using fluid motor 40 and rotates the gate 34 up using fluid motor 36. The latch mechanism being biased, will then move to its locked position locking the stanchion 18 to the railroad car 16. This allows the tractor 10 and trailer 12 to move off the railroad car, while leaving the stanchion 18 properly positioned for loading as illustrated in FIG. 9.

As can be seen from the method of the loading and unloading of FIGS. 1–9, the interaction between the tractor 10 and the stanchion 18 allows the stanchion to be positioned and repositioned with the loading and unloading of the trailer 12, as well as being raised and lowered in its appropriate position. This is all accomplished from the tractor 10 by a single operator. Also, the stanchion 18 and the trailers 12 may be positioned anywhere along the surface of the car 16. This allows closer positioning of the trailers relative to each other, thereby reducing wind resistance and making more efficient loading.

Figure 10:
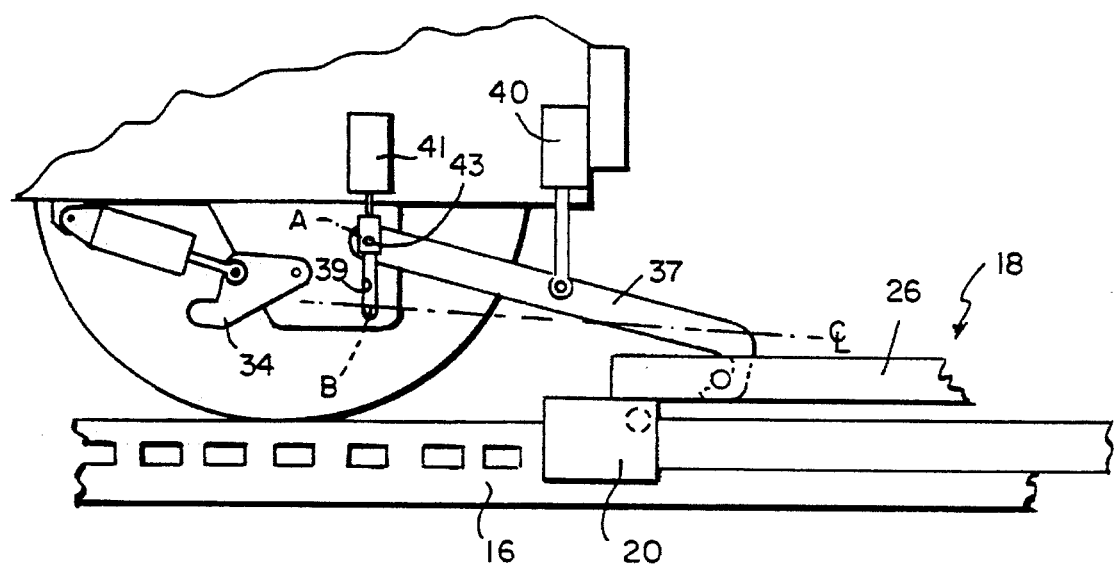
FIG. 10 is a partial view of a modification for the hook positioning mechanism.

To prevent any forward movement of the stanchion 18 from being translated into a lifting or rising motion of the stand 26, a mechanism is provided in FIG. 10 to change the center line of the hook 38. In addition to fluid motor 40, a second fluid motor 41 is provided and connected to the pivot point A of the arm of the hook 38. The arm 37 has hook 38 thereon. The fluid motor 41 shifts the pivot point 43 from position A down to position B in slot 39 to thereby lower the angle that the arm of the hook 38 makes with the direction of motion. This would substantially reduce the lifting force on the stand 26 during a sliding motion of the sled 20.

Figure 11:
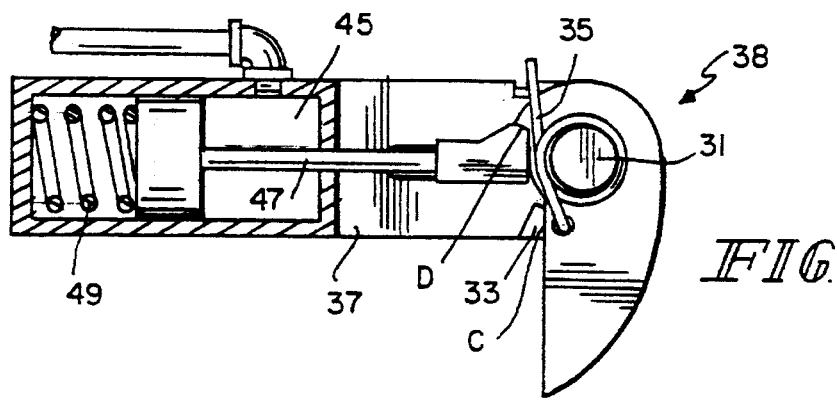
FIG. 11 is a partial cut-away side view of a hook according to the principles of the present invention in its set position.
Figure 12:
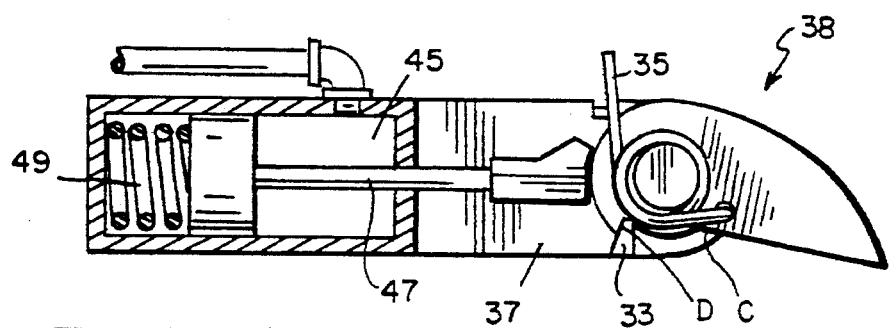
FIG. 12 is a partial cut-away side view in its released position.

To more accurately control the operation of the hook 38, a modification is illustrated in FIGS. 11 and 12. Hook 38 is pivotally connected at 31 to the hook arm 37. A stop 33 is provided on the hook arm 37 and engages surface C of the hook 38 in its hooking position as illustrated in FIG. 11 or engages surface D in its unhooked or release position as in FIG. 12. A torsion spring 35 biases the hook 38 to its set or hooking position as illustrated in FIG. 11 with a surface C engaging the stop 33. A fluid motor 45 forms part of or is connected to the hook arm 37 and includes a plunger 47 having one end extending out towards the hook 38. Spring 49 within the fluid motor 45 biases the plunger 47 to its extended position. Upon fluid actuation, the piston 47 retracts against the spring 49 and retracts the piston 47. In its extended position as illustrated in FIG. 11, the piston 47 engages an axis of stop for surface D of the hook 38 and locks it in its hooked or set position. When it is desired to release the hook, fluid pressure retracts the plunger 47 causing it to disengage surface D of the hook 38. Forces applied to the hook 38 to the right in FIGS. 11 and 12 will cause the hook to rotate against the spring 37 and move to a release or unhooking position. These forces are generally a forward movement of the hook relative to the stanchion 18. Once this pressure is released, the spring 35 returns the hook to the hooking position illustrated in FIG. 11. Once the fluid pressure in the motor 45 is released, the spring 49 forces the piston 47 to extend and engage the hook 38. Once the force on the hook 38 is removed, spring 35 pivots hook 38 to the position at FIG. 11 as spring 49 drives the piston 47 into its engaging lock position against surface D of the hook 38. If it is desired to have the hook 38 continue to rotate clockwise from its lock position in FIG. 11 to aid in placement, the stop 33 would be removed. This may be desirable when the hook arm 37 has dropped and the hook is sliding across the stanchion 18.

Figure 15A:
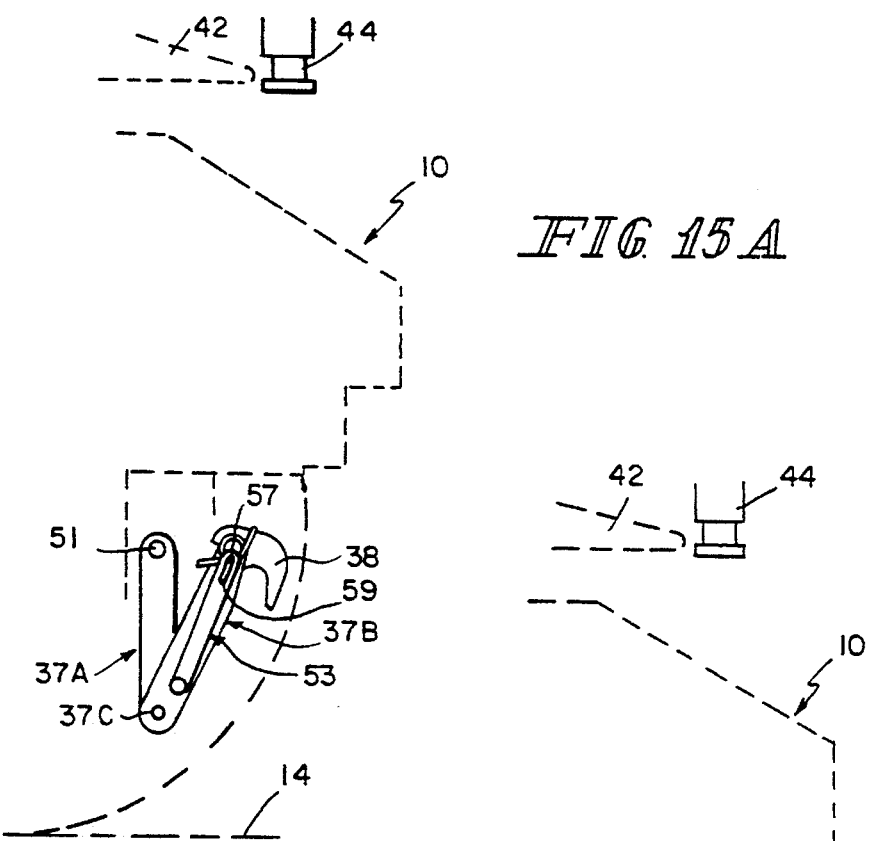
FIGS. 15A, 15B, and 15C are schematic views of a modification of the hook mechanism according to the principles of the present invention in a retracted, extended and lowered, and extended and raised positions.
Figure 15B:
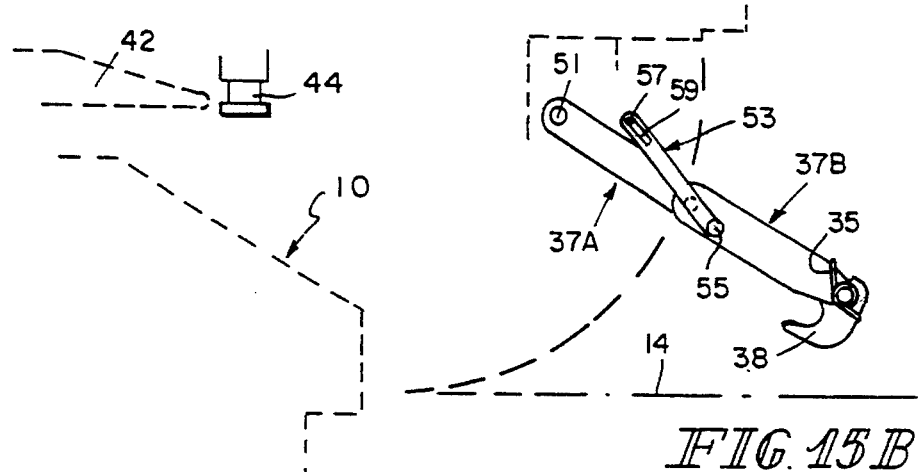
Figure 15C:
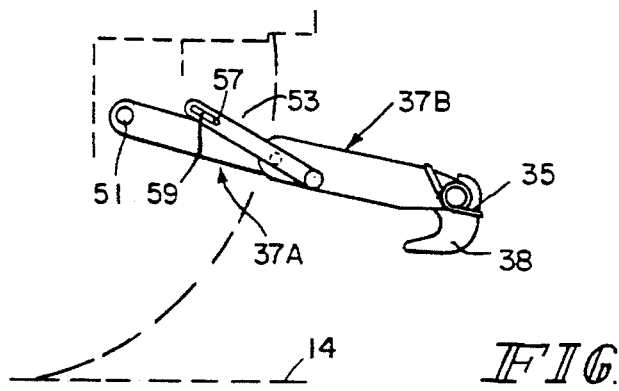

To more accurately control the position of the hook when the stand is raised, an articulated modification is illustrated in FIGS. 15A, 15B, and 15C. Hook arm 37 has a first link 37A pivotally connected to the tractor 10 by a shaft 51 and a second link 37B including the hook 38 pivotally connected to the first link at 37C. Although the hook structure of FIGS. 11 and 12 are included as the preferred embodiment, a rigid hook may be used if desired. A third link 53 is pivotally connected to the second link 37B at 55 and is connected to the tractor 10 by a pin 57 extending into slot 59 of the third link 53. An operator or fluid motor equivalent to 41 will control the position of the hook by rotating shaft 51. This interconnection is well known and has been deleted from the figures for sake of clarity.

The hook in its retracted position is illustrated in FIG. 15A wherein the operator controls the link 37A to be in its substantially vertical position. This will cause link 37B to be in its retracted position as controlled by link 53. To extend the hook to the position in FIG. 15B, shaft 51 is rotated counter-clockwise until the links 37A and 37B are coaxial. The pin 57 lies in the uppermost portion of the slot 59 in link 53. The position in FIG. 15B may be obtained merely by releasing the biasing force on shaft 51 and allowing gravity to move the link 37B downward.

Any upward movement of the extended hook is accommodated by the slot 59 in the link 53. These forces may be by the rising of the stand to the position illustrated in FIG. 15C. The pin 57 is shown in the lower end of the slot 59. This raising of the hook from the position of FIG. 15B to that of 15C does not affect the colinearity of the hook links 37A and 37B.

To retract the hook 37 from the position in FIGS. 15B or 15C, the shaft 51 is rotated clockwise until it reaches the position of FIG. 15A. FIGS. 15A–15C are schematic representations to aid in the understanding of the location of the elements. Since the third link 53 is always under tension, it may be replaced with a cable.

Figure 22:
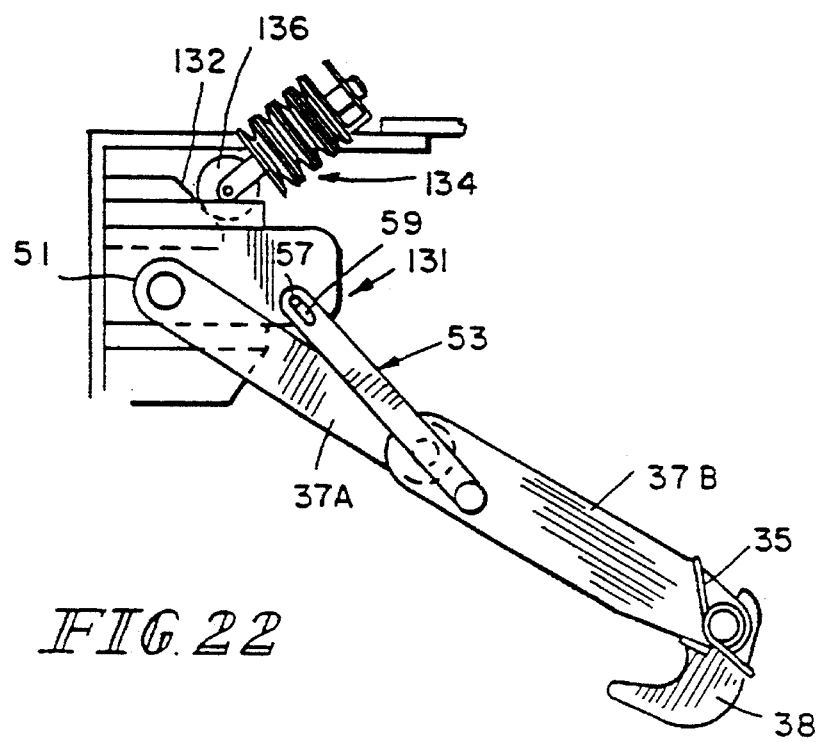
FIG. 22 is a schematic view of a shock absorber connection of the hook.

To accommodate large forces external on the hook mechanism 37, 38, a shock absorbing system is illustrated in FIG. 22. The links 37A and 53 are connected to a block 131 slidably mounted to the tractor 10. A spring 134 and roller 136 are connected to the tractor and ride on a ramp 132 on the sliding block 131.

Figure 13:
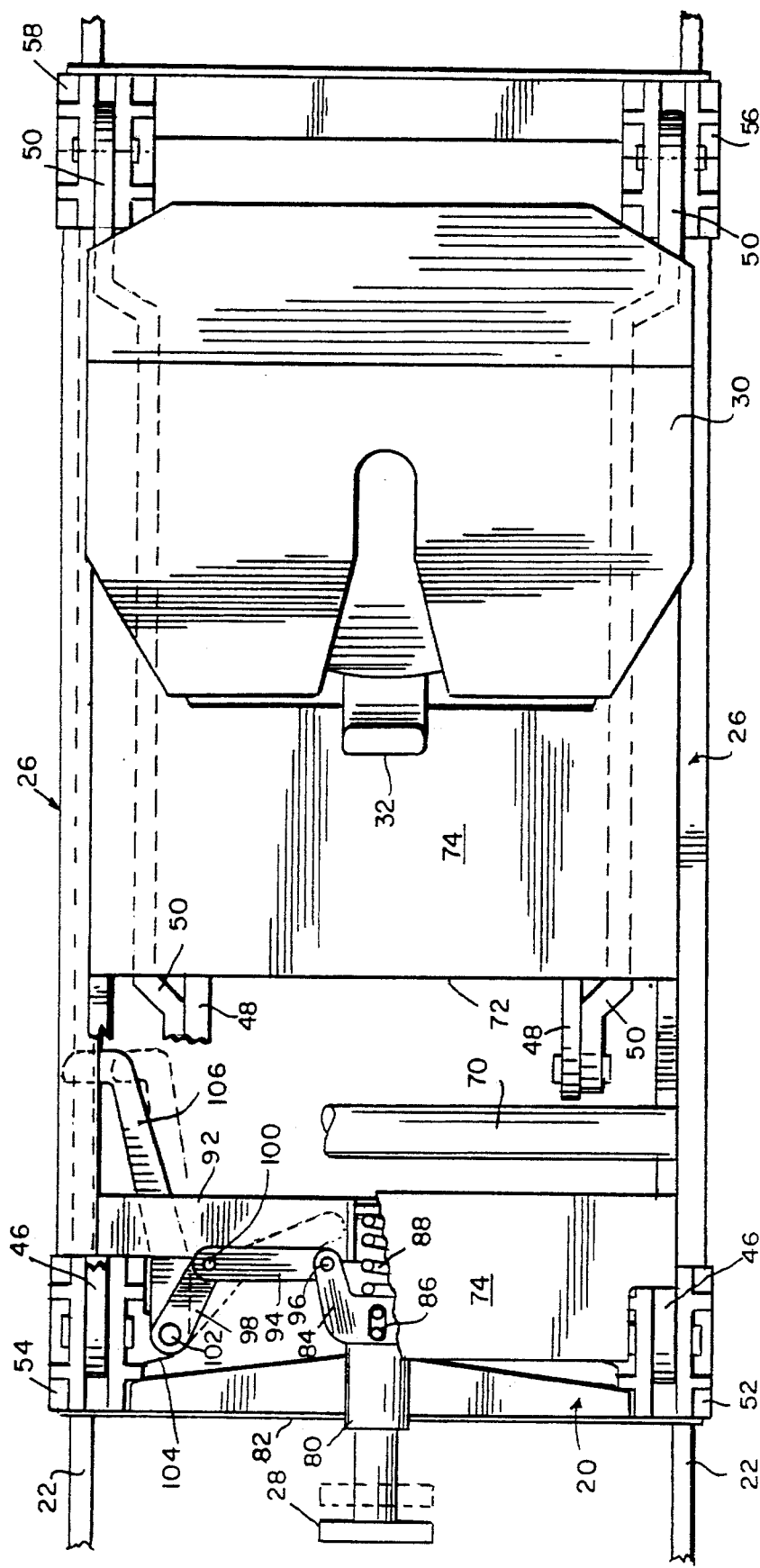
FIG. 13 is a plan view with partial cut-aways of a stanchion according to the present invention.
Figure 14:
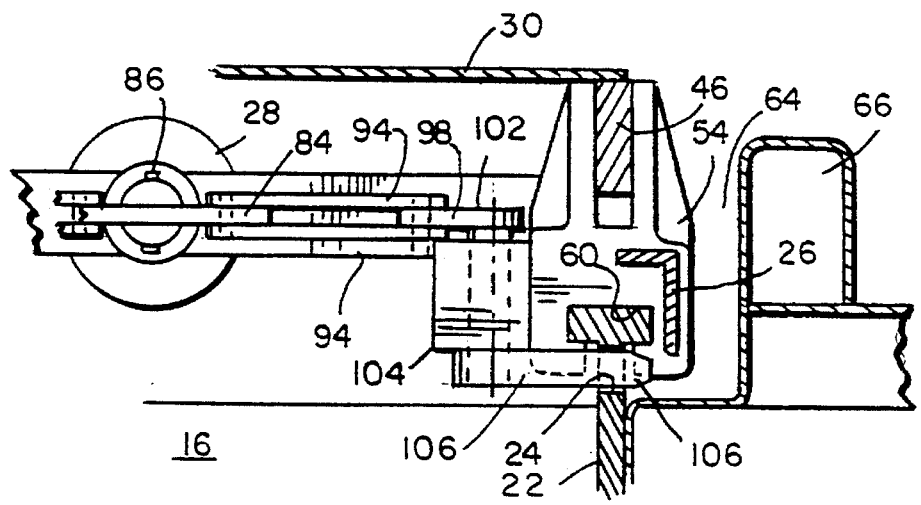
FIG. 14 is a partial cut-away front view of the stanchion of FIG. 10.

The stanchion 18 according to the present invention is illustrated in FIGS. 13 and 14. Since the stand 26, the fifth wheel connection 30 and the release mechanism 32 are well known prior art structures, they will not be described and illustrated in detail. The improvement of the present invention is the specific latching mechanism to lock the frame or sled 20 of the stanchion 18 to the railroad car 16. This is used in combination with the rail 20 having apertures 24 and the operable elements 34 and 38 on the tractor 10.

The sled 20 includes a rectangular frame having guides 52, 54, 56 and 58 at its four corners. Pivotally connected to the guides 52 and 54 is the vertical stand member 46. Pivotally connected to the guides 56 and 58 is one of the diagonal struts 50. As illustrated in FIG. 14, each of the guides 52, 54, 56 and 58 includes a channel 60 for receiving the horizontal portion of the rail 22. A vertical portion of the rail 22 extends down and out of the channel 60 and is secured to the frame of the car 16. The rail 22 and channel 60 position the stanchion 18 in a recess 64 in surface 14 of car 16. The wheels of the trailer 12 and the tractor 10 lie on either side of the protective wall 66 of the recess 64.

A bar 70 lies in an opening 72 of plate 74 which is secured to the vertical members 46 of the stand 26. The hook 38 engages the bar 70 in raising the stanchion during loading, and in repositioning the stanchion during unloading operations as previously described.

The latch mechanism includes the release plunger 28 which extends through a collar 80 which is secured to a face plate 82 of the sled frame. A yoke 84 is secured to the other end of the plunger 28 by fasteners 86. A spring 88 engages, at one end, the yoke 84 and, at its other end, a spring stop which is secured to plate.92 of the frame. The spring 88 biases the plunger 28 to its extended or locked position. A pair of links 94 pivotally connected at 96 to the yoke 84 at one end and to an upper arm 98 of a dog at 100 at its other end. The upper arm 98 of the dog is connected by shaft 102 to the lower end of the dog 106 through a journal 104 in the guide 54. The end of dog 106 engages the apertures 24 in the rail 22 to lock the stanchion to the rail in its solid position. When the plunger 28 is retracted by the application of an external force, the yoke 84 moves the link 94 and the upper arm 98 and dog 106 to its retracted or unlocked position as illustrated in phantom in FIG. 13.

It should be noted that the relationship of links 94, yoke 84 and upper arm 98 are designed such that any forces on the dog 106 are applied along the axis of the links 94 which extends between the pivot points 96, 100. These forces along this axis thereby do not transmit forces to the plunger 28, and therefore will prevent unlocking of the dog 106 by forces applied to the dog. These forces may result from the attempted shifting of the trailer on the railroad car or any of the forces applied to the sled 20.

Although only one dog 106 is shown in FIG. 13, a second dog is under plate 74. As illustrated in FIG. 14, the second dog 106 engages an aperture 24 in the rail 22 in the vertical portion of the rail 22 below the horizontal portion.

Figure 17:
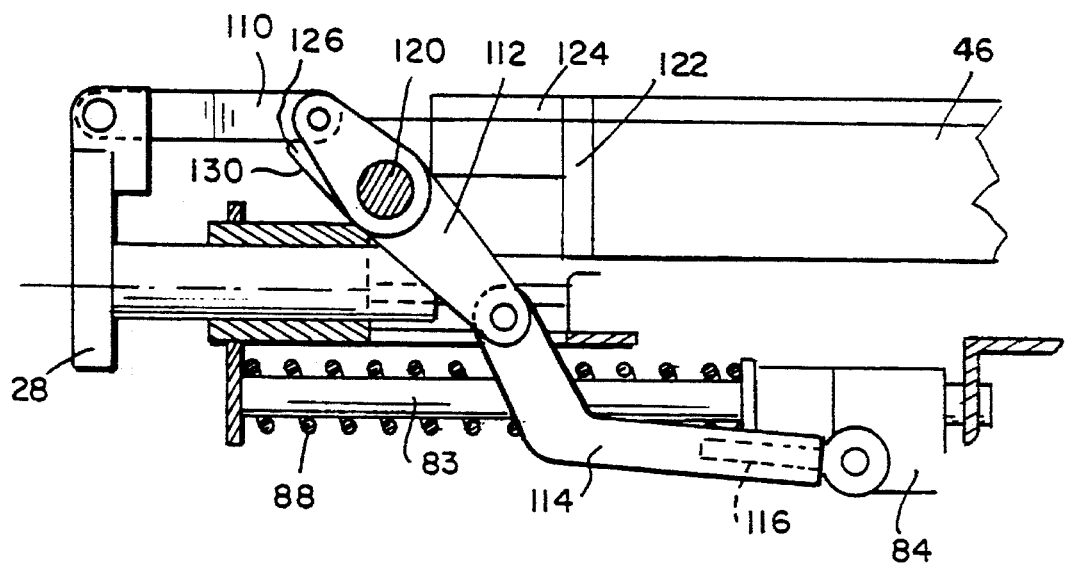
FIG. 17 is a partial cross-section view of the stanchion of FIG. 16.

A modification to the latch system is illustrated in FIGS. 16 and 17. Instead of the plunger 28 being connected directly to the yoke 84, the plunger 28 is connected through links 110, 112, 114, and plate 116 to the yoke 84. The yoke 84 rides along rail 83 around which is wound the biasing spring 88 which biases the yoke 84 to the dog extended or latches' locked position. A single link 118 connects the yoke 84 to the dog 106. In their locked position,the single links 118 connecting the yoke 84 to the dogs 106 are coaxial. This provides a more stable locking position for the dogs and any force which attempts to unlock the dogs, when in use other than the force applied from the plunger 28 to the linkage, will be transferred between the dogs and prevent them from unlocking.

It should be noted that in the top half of FIG. 16, the plunger 28 is in its extended position with the latch or dogs in their extended or locked position and in the lower half of FIG. 16, the plunger 28 is in its retracted position and the dog or latch is in their retracted or unlocked position.

Link 112 is secured to a rotary shaft 120 rotatably connected to the sled. Also connected to the rotary shaft 120 is the interlock system. The interlock system prevents the stand from being raised when the dogs are in their locked position. If the stand is in its raised position, the interlock prevents the dogs from unlocking. The interlock system is illustrated in FIGS. 16–21. It includes a cam follower 124 mounted to flange 122 connected to each of the front legs 46 of the stand and also includes a pair of cams 126 connected to the shaft 120 to rotate therewith. The cam 126 includes a camming surface 128 and a second surface 130.

Figure 18:
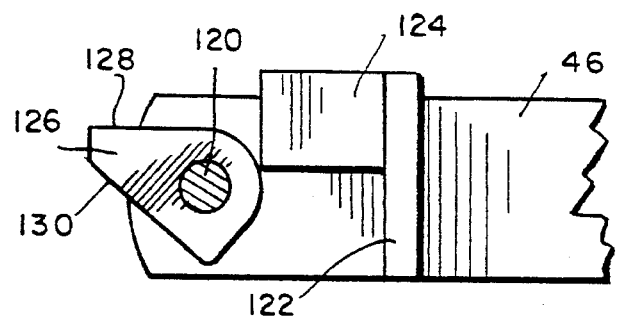
FIG. 18 is a schematic presentation of the interlocking mechanism with the stand in its lowered position and the latch in its locked condition.
Figure 19:
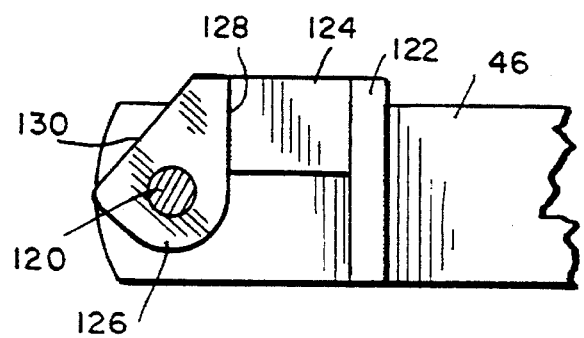
FIG. 19 is a schematic view of the interlock mechanism with the stand in its lowered position and the latch mechanism in its unlocked condition.

When the stand is in its lowered position and the latch or the dogs 106 are in their locked position as in FIG. 16, top half, and FIGS. 17 and 18, the cam surface 128 is generally horizontal and spaced from the cam follower 124. Thus, the stand can move from its lowered position of figure 18 to its raised position in FIG. 20. Forces applied to plunger 28 to unlock the dogs 106, illustrated in the lower half of FIGS. 16 and 19, rotates via links 110 and 112 the shaft 120 clockwise in FIGS. 17–21. This positions the camming surface 128 into engagement with the cam follower 124 as illustrated in FIG. 19. This engagement prevents the stand from rising. Any attempt to raise the stand will cause counter-clockwise rotation of the cam 126 which will immediately drive the dogs 106 into their extended or locked position. The design of the linkage of FIGS. 16 and 17 is such that if the stand is in any position other than substantially horizontal or lowered, the dogs 106 will be extended sufficiently to have a locking condition.

Figure 20:
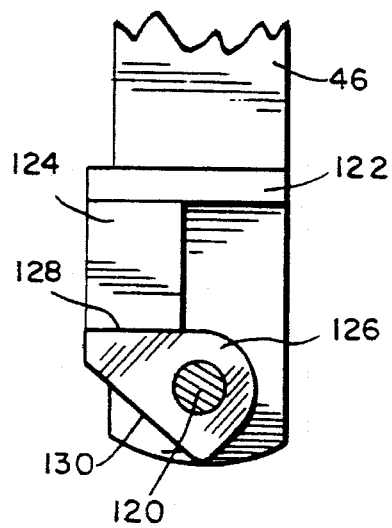
FIG. 20 is a schematic view of the interlock mechanism with the stand it its raised position and the latch in its locked condition.
Figure 21:
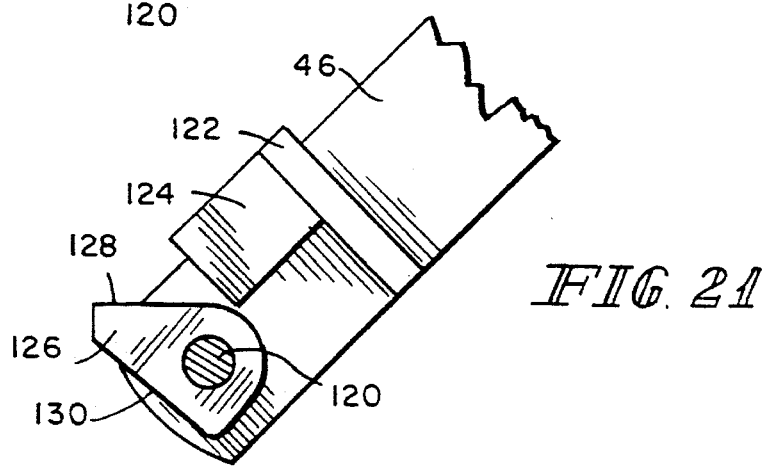
FIG. 21 is a schematic view of the interlock mechanism with the stand in transition between its raised and lowered position and the latch in its locked condition.

With the latch or dogs in their locking position, the surface 128 is horizontal. When the stand 46 is in its raised position, the camming surface 128 engages the cam follower 124 as illustrated in FIG. 20. The relative position of the camming surface 128 and the cam follower 124 with the stand in transition between its raised and lowered position and the dogs being locked is illustrated in FIG. 21. It should also be noted that with the stand in its raised position and being locked in its raised position by other mechanisms, the dogs 106 cannot be released because of the interlock mechanism. Any attempt to unlock the dogs would cause clockwise rotation of cam 126. This motion would be stopped by the locked leg 46 of the stand.

Thus, it can be seen that the interlock system prevents the stand from being raised when the dogs are unlocked as in FIG. 18 as well as preventing the dogs from being unlocked when the stand is raised, as illustrated in FIG. 20. Even if the stand 46 did not have its own locking mechanism, the weight of the trailer on the leg 46 would provide sufficient force to prevent clockwise rotation of cam 126 to unlock the dogs. Assuming a farce was accidentally applied in an attempt to unlock dogs in the partially raised position of FIG. 21, the cam 126 will rotate clockwise and come into engagement with the cam follower 124. Since it does not rotate a full 90 degrees, for example, the dogs will be moved but will not fully disengage from the locked position in slots 24 of the rail 22. It should be noted that 90 degrees is only an example of the amount of rotation travel on a linkage system. The linkage system should be designed such that the dogs disengage only after a substantial portion of travel is completed.

The unique latch mechanism and its cooperation with the gate and hook on the tractor provides the versatility of the present system. Thus, a complete operation and methods of loading and unloading can be conducted by a single operator of the tractor. Other than dismounting from the tractor to connect and disconnect the brake systems of the tractor 10 and the trailer 12, the operator can load and unload the trailer 12 as well as position, reposition, raise and lower the stanchion 18 all from the cabin of the tractor 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A stanchion to support trailers on a railroad car, comprising:

sled means for moving along a surface of a railroad car;

stand means, mounted to said sled means and having lowered and raised positions, for receiving and securing a portion of a trailer;

latch means on said sled means having locked and unlocked positions for engaging and disengaging said railroad car to prevent and permit, respectively, movement of said sled means along said surface; and interlock means between said latch means and said stands means for permitting said latch means to disengage said railroad car only when said stand means is in said lowered position.

2. A stanchion according to claim 1 including biasing means for biasing said latch means into said locked position.

3. A stanchion to support trailers on a railroad car, comprising:

sled means for moving along a surface of a railroad car;

stand means, mounted to said sled means and having lowered and raised positions, for receiving and securing a portion of a trailer;

latch means on said led means having locked and unlocked positions for engaging and disengaging said railroad car to prevent and permit, respectively, movement of said sled means along said surface;

a cam connected to said latch means and having a cam surface which has a first and second position corresponding to said locked and unlocked positions of said latch means respectively; and a cam follower connected to said stand means for engaging said cam surface to allow said cam surface to assume said second position, permitting said latch means to disengage said railroad car, only when said stand means is in said lowered position.

4. A stanchion according to claim 3 wherein said cam follower disengages said cam surface in said first position when said stanchion means is not in said raised position.

* * * * *